United States Patent [19]

Yamada et al.

[11] Patent Number: 4,470,617
[45] Date of Patent: Sep. 11, 1984

[54] WEBBING LOCK DEVICE

[75] Inventors: Makoto Yamada, Toyota; Toshio Gyoda, Nagoya; Takashi Kawaharazaki, Toyoake, all of Japan

[73] Assignees: Toyota Jidosha Kogyo Kabushiki Kaisha; Kabushiki Kaisha Tokai-Rika-Denki-Seisakusho, both of Aichi, Japan

[21] Appl. No.: 338,880

[22] Filed: Jan. 12, 1982

[30] Foreign Application Priority Data

Jul. 27, 1981 [JP] Japan ............................ 56-111322[U]

[51] Int. Cl.³ ............................................... A62B 35/00
[52] U.S. Cl. ..................................... 280/806; 280/802
[58] Field of Search ............... 280/801, 806, 807, 808; 188/251 R, 251 A; 242/107.2

[56] References Cited

U.S. PATENT DOCUMENTS

| | | | |
|---|---|---|---|
| 2,554,548 | 5/1951 | Albagnac | 188/251 R |
| 3,455,868 | 7/1969 | D'Alessandro | 188/251 A |
| 3,940,527 | 2/1976 | Brandon | 188/251 A |
| 4,120,466 | 10/1978 | Adomeit | 280/806 |
| 4,262,932 | 4/1981 | Motonami et al. | 280/806 |
| 4,278,215 | 7/1981 | Nakaho | 280/806 |

Primary Examiner—Joseph F. Peters, Jr.
Assistant Examiner—Ross Weaver
Attorney, Agent, or Firm—Parkhurst & Oliff

[57] ABSTRACT

In a webbing lock device, there are provided a pair of lock members for clamping the intermediate portion of an occupant restraining webbing so as to bring an occupant into a restrained state in the event of an emergency situation of a vehicle, and resin material deformable in accordance with irregularities on the surfaces of the webbing, when the webbing is clamped, is provided on the surface of at least one of the lock members, whereby frictional resistances between the webbing and the lock members are increased and concentration of stress is avoided.

12 Claims, 4 Drawing Figures

WEBBING LOCK DEVICE

BACKGROUND OF THE INVENTION

1. Field of the Invention

This invention relates to a webbing lock device used in a seatbelt system for restraining an occupant in the event of an emergency situation of a vehicle and adapted to clamp the intermediate portion of a webbing so as to bring the occupant into a restrained state in the event of an emergency situation of the vehicle.

2. Description of the Prior Art

A webbing lock device is provided between an occupant restraining portion of a webbing and a webbing retractor for winding an end portion of the webbing and adapted to stop the movement of the webbing in the longitudinal direction thereof in the event of an emergency situation of a vehicle. Consequently, the webbing is not unwound from the retractor in the event of an emergency situation of the vehicle, whereby the occupant is brought into a tightly restrained state, thereby improving the safety of the occupant.

Notwithstanding, in the conventional webbing lock device, when a pair of lock members clamp the intermediate portion of the webbing, a clamping force is concentrated at a portion of the webbing, whereby there has been a possibility that the webbing is damaged due to this concentration of stress. Furthermore, frictional resistance forces generated between the lock members and the webbing have been low, thus tending to permit the webbing to creep in the longitudinal direction thereof.

SUMMARY OF THE INVENTION

The present invention has been developed to obviate the above-described disadvantages of the prior art and has as its object the provision of a webbing lock device wherein, at the time of clamping, concentration of stress to a webbing is avoided and friction-resistant forces increased between the webbing and the lock members to prevent a phenomenon of creep, so that the safety of an occupant is improved.

The webbing lock device according to the present invention contemplates that resin materials are provided on the surfaces at the webbing sides of the lock members, whereby, when the webbing is clamped by the lock members, the synthetic resin materials are deformed in accordance with the irregularities on the surfaces of the webbing, so that the frictional resistance forces are increased, and moreover, the concentration of stress is avoided.

Description will hereunder be given of embodiments of the present invention.

DESCRIPTION OF THE PREFERRED EMBODIMENTS

Figure 1:
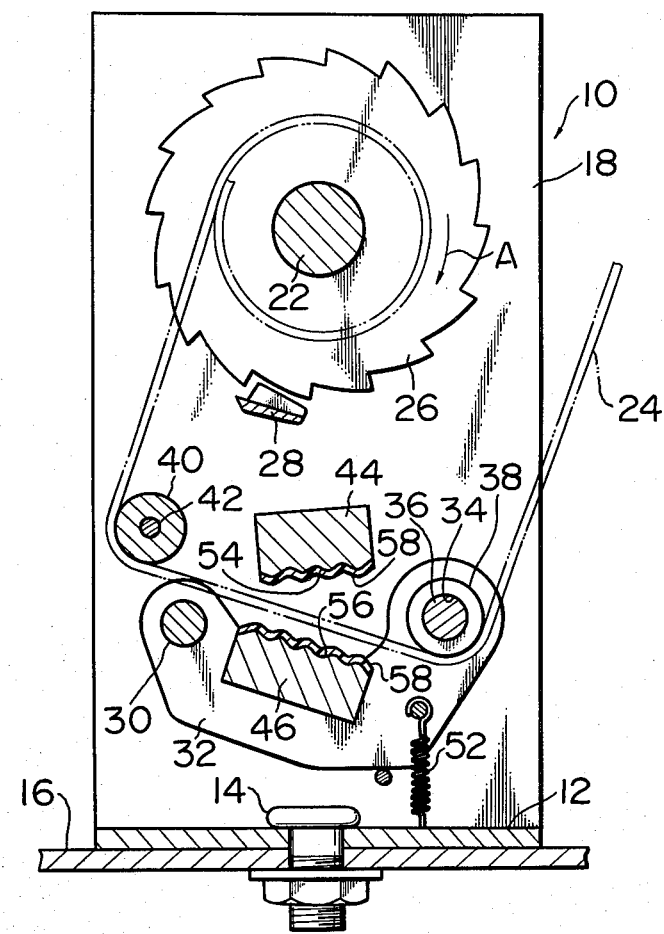
FIG. 1 is a sectional view showing a webbing retractor, to which a first embodiment of the webbing lock device according to the present invention is applied.

FIG. 1 shows the first embodiment, wherein the webbing lock device according to the present invention is applied to a webbing retractor 10.

A frame 12 of the retractor is solidly secured to a vehicle body 16 by means of a bolt 14. A pair of leg plates 18 extend from opposite side portions of the frame 12 in parallel to each other (However, in FIG. 1, one of the leg plates 18 is not shown). Rotatably supported across these leg plates 18 is a takeup shaft 22, to which is secured one end of an occupant restraining webbing 24. This takeup shaft 22 is biased by a spiral spring, not shown, in the direction of winding the webbing 24 (a direction indicated by an arrow A) so as to wind the webbing 24 in layers. Secured to one end, not shown, of this webbing 24 is a tongue plate, which is adapted to engage a buckle device affixed to the vehicle body, so that the intermediate portion of the webbing 24 can be fastened about the occupant.

Ratchet wheels 26 are affixed to the takeup shaft 22 and rotatable with the takeup shaft 22. Opposed to these ratchet wheels 26 is a lock plate 28 rotatably supported on the leg plates 18. In the event of an emergency situation of the vehicle, this lock plate 28 is pushed up by an acceleration sensor constituted by a pendulum or the like, not shown, and meshed with the ratchet wheels 26, so as to prevent the rotation of the takeup shaft 22 in the direction of unwinding the webbing (in a direction opposite the direction indicated by the arrow A).

Figure 2:
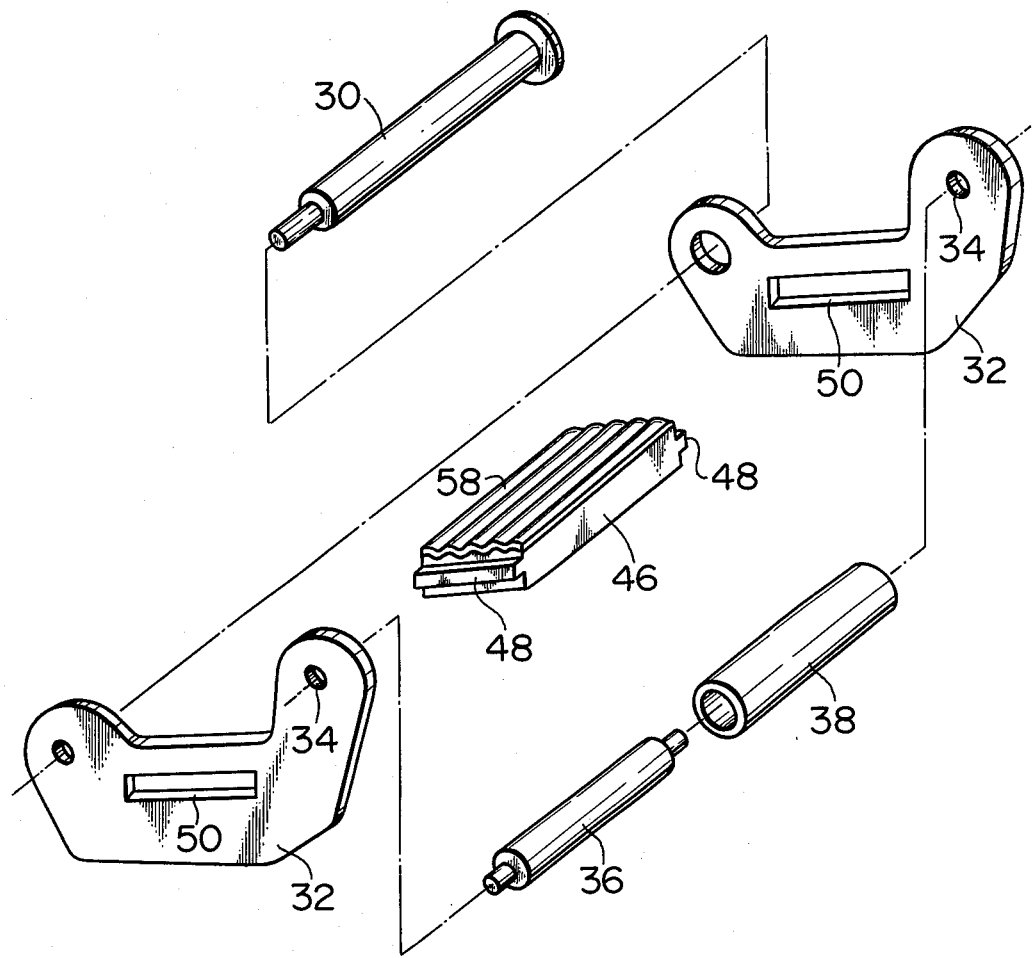
FIG. 2 is a disassembled perspective view showing the relationship between the lock members and side frames.

A shaft 30 is mounted across the pair of leg plates in parallel. A pair of side frames 32 are supported on the ends of the shaft 30 as shown in FIG. 2. Penetratingly provided at the forward ends of these side frames 32 are round holes 34, in which is rotatably supported a rotary shaft 36 having a roller 38 thereon. A webbing 24 unwound from the take up shaft 22 is wound on the outer periphery of this roller 38.

A portion of the webbing 24 between this roller 38 and the takeup shaft 22 is in turn wound on a roller 40, which is rotatably supported on a pin 42 mounted across the leg plates 18. A stationary lock member 44 is provided at one side of a portion of the webbing 24 between the rollers 38 and 40. This stationary lock member 44 is formed into a block and solidly secured at longitudinally opposite ends thereof to the leg plates 18.

On the other hand, a movable lock member 46 is provided at the other side of the portion of the webbing 24 between the rollers 38 and 40. This movable lock member 46 is formed into a block similar to the stationary lock member 44, and, as shown in FIG. 2, projections 48 provided at longitudinally opposite ends thereof are inserted into rectangular holes 50 formed in the side frames 32, whereby the movable lock member 46 is mounted across the pair of side frames 32.

Consequently, the movable lock member 46 is rotatable about the shaft 30 together with the side frames 32. During normal running condition of the vehicle, the side frames 32 are rotated at the maximum value in the clockwise direction as shown in FIG. 1 by a biasing force of tension coil springs 52 stretched between the frame 12 and the side frames 32, whereby the side frames 32 are separated from the stationary lock member 44 and a space for allowing the webbing 24 to pass therethrough is formed between the stationary lock member 44 and the side frames 32.

However, when the webbing 24 is increased in tension at the event of an emergency situation of the vehicle, the side frames 32 are rotated together with this movable lock member 46 in the counterclockwise direction in FIG. 1 so as to clamp and lock the intermediate portion of the webbing 24 between the stationary lock member 44 and the movable lock member 46.

The facing surfaces 54 and 56, of these lock members 44 and 46 are formed into corrugated surfaces complementary to each other. Coated to these corrugated surfaces 54 and 56, respectively, are synthetic resin layers 58 made of soft vinyl chloride or the like. Each of these synthetic resin layers 58 is a sheet material having a predetermined thickness. These synthetic resin layers 58 may be secured on the corrugated surfaces 54 and 56, respectively, by a tape having an adhesive on one surface thereof. Or, it is possible to use a molding method such as the injection molding, dipping or the like.

Description will now be given of action of this embodiment.

FIG. 1 shows the normal running condition of the vehicle, wherein the occupant can unwind the webbing from the takeup shaft 22 for fastening it about him, and further, he can desirably change his driving posture during driving of the vehicle.

If the vehicle has fallen into the event of an emergency situation such as a collision, then, through the action of an acceleration sensor, not shown, the lock plate 28 is meshed with the ratchet wheels 26 to thereby instantly stop the webbing unwinding rotation of the webbing 24 from the takeup shaft 22.

Simultaneously with this, the occupant fastened thereabout with the webbing 24 moves in the direction of the collision, whereby a high tensile force is generated in the webbing 24. This tensile force is imparted to the side frames 32 via the roller 38, whereby the side frames 32 are rotated about the shaft 30 in the counterclockwise direction in FIG. 1. Consequently, the intermediate portion of the webbing 24 is clamped by the pair of lock members 44 and 46 to be deformed into a corrugated shape, and stopped in its longitudinal movement, so that the occupant fastened thereabout with the webbing 24 is reliably restrained, thereby enabling to secure the safety of the occupant.

In particular, since the pair of lock members 44 and 46 are provided at the corrugated surfaces thereof with the synthetic resin layers 58, these synthetic resin layers 58 are deformed by the clamping forces and bite into the irregularities on the surfaces, i.e., the weave pattern of the textile structure of the webbing 24 in order to increase frictional forces between the webbing and the synthetic resin layers 58, so that the phenomenon of creep of the webbing 24 between the lock members 44 and 46 can be prevented. Furthermore, the synthetic resin layers 58 contact the webbing 24 over the large areas thereof, whereby the clamping force does not partially act on the webbing, so that the concentration of stress can be avoided, thus protecting the webbing from being damaged.

If the synthetic resin layers 58 have a fusing point lower than the fusing points of nylon and polyester which are the materials of webbings widely used, then the surfaces and thereabout of the synthetic resin layers 58 are fused to some extent due to the frictional heat generated when the webbing is clamped, whereby the contact areas between the synthetic resin layers and the webbing are further increased. Additionally, when portions of the synthetic resin layers are fusing to some extent due to the frictional forces between the webbing and the synthetic resin layers, if a tensile force of an unusually high value is generated in the webbing, slips are caused to the resin surface portions, so that the webbing is permitted to slightly move in the longitudinal direction thereof, thereby enabling to protect the webbing from being clamped by excessive forces.

Figure 3:
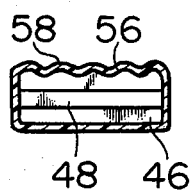
FIGS. 3 and 4 are sectional views showing the movable lock members used in a second and a third embodiments of the present invention, respectively.

Next, FIG. 3 shows the second embodiment of the present invention, in which the synthetic resin layer 58 encloses the lock member 46, so that the same advantage as in the preceding embodiment can be achieved.

Figure 4:
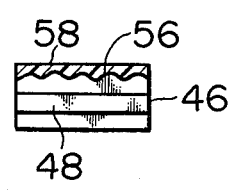

Additionally, the synthetic resin layer 58 shown in FIG. 4 has a flat surface for contacting with the webbing, whereby the same advantage as described above can be accomplished.

Further, according to the present invention, the mounting surfaces of the synthetic resin layers onto the lock members may be formed into flat surfaces. The surfaces of the synthetic resin layers may have webbing contact surfaces having fine irregularities. Further smaller irregularities in pitch than those on the corrugated surfaces in the first embodiment may be provided so as to increase the frictional resistances between the webbing and the synthetic resin layers.

As has been described hereinabove, the webbing lock device according to the present invention is of such an arrangement that resin materials are provided on the locking surfaces of the lock members, thereby enabling offer of such outstanding advantages that the frictional forces between the webbing and the lock members are increased and concentration of stress is avoided.

What is claimed is:

1. A web locking device for use in a vehicle seatbelt system for protecting an occupant in the event of an emergency situation comprising:
   a takeup shaft for receiving an occupant restraining web;
   a first lock member having a web engaging surface positioned adjacent an intermediate portion of said web between said takeup shaft and occupant restraining portion of said web;
   a second lock member having a web engaging surface positioned in opposed relation to said first lock member adjacent to said intermediate portion of said web and constructed and arranged to clamp said intermediate portion of said web between the web engaging surfaces of said first and second lock member during an emergency situation; and
   a layer of synthetic resin covering at least a portion of the web engaging surface of at least one of said first and second lock members and deformable in response to irregularities of said web, said synthetic resin layer having a fusing point lower than the fusing points of nylon and polyester such that frictional forces between said web and said lock members are increased due to the fusing of at least a portion of said synthetic resin layer from the heat generated during clamping between said first and second lock members to increase the contact area between said web and synthetic resin layer and prevent creep of the webbing between said first and second lock member.

2. A web locking device as set forth in claim 1, wherein said first lock member is a stationary lock member.

3. A web locking device as set forth in claim 2, wherein said first lock member is solidly secured to a frame rotatably supporting said takeup shaft.

4. A web locking device as set forth in claim 1, wherein said synthetic resin material is made of soft vinyl chloride.

5. A web locking device for use in a seatbelt system for restraining an occupant with a web during a vehicle collision comprising:
- a main frame solidly secured to a vehicle body;
- a takeup shaft rotatably supported on said main frame and receiving and winding one end portion of an occupant restraining web;
- side frames rotatably supported on said main frame and having a roller secured therebetween, said roller being positioned to guide a portion of said web;
- a stationary lock member having a web engaging surface and affixed to said main frame adjacent an intermediate portion of said web between said takeup shaft and said roller;
- a movable lock member having a web engaging surface and affixed to said side frames in opposed relation to said movable lock member adjacent said intermediate web portion and constructed and arranged to move and clamp said web between the web engaging surfaces of said stationary and movable lock member upon movement of said roller by said web in response to a tensile force applied to said web in a vehicle collision; and
- a layer of synthetic resin secured to at least a portion of the web engaging surface of at least one of said stationary and movable lock members, said resin layer having a hardness sufficient to bite into the web during web clamping and a fusing point lower than the fusing point of nylon and polyester such that said synthetic resin layer is at least partially fused due to the frictional heat generated during web clamping to increase the contact area between said synthetic resin layer and said web and prevent creep between said web and said stationary and movable lock members.

6. A web locking device as set forth in claims 1, 2 or 3, wherein the web engaging surface of said at least one lock member having a synthetic resin layer has a corrugated shape and a synthetic resin layer having a thickness of predetermined value and corrugated shape similar to the corrugated shape of said at least one lock member.

7. A web locking device as set forth in claim 1 wherein said synthetic resin layer on said one locking member forms a flat surface.

8. A web locking device as set forth in claim 1 wherein said synthetic resin layer is coupled to enclose said at least one of said first and second lock members.

9. A web locking device as set forth in claim 1 wherein said synthetic resin layer is formed by injection molding on said web engaging surface.

10. In a vehicle restraining system having a web for restraining occupant movement and first and second clamping members each having a web engaging surface for clamping said web between said members to prevent web movement, the improvement comprising:
- a material covering at least a portion of at least one of said web engaging surfaces having a fusing point lower than said web such that at least a portion of said material fuses due to frictional heat generated during web clamping to increase the clamping contact area.

11. The system of claim 10 wherein said material is a synthetic resin material.

12. The system of claim 10 wherein said web is selected from one of the group comprising nylon and polyester and wherein said material is a synthetic resin having a fusing point lower than said selected one of nylon and polyester.

* * * * *